United States Patent
Carlsson et al.

(10) Patent No.: US 9,873,407 B2
(45) Date of Patent: Jan. 23, 2018

(54) AUTOMATIC REMOVAL OF WATER FROM VEHICLE SURFACES

(71) Applicant: SEMCON SWEDEN AB, Göteborg (SE)

(72) Inventors: Magnus Carlsson, Frölunda (SE); Jonas Berg, Hyssna (SE); Linus Helgesson, Motala (SE); Johan Alminger, Källered (SE); Stig Ursing, Västra Frölunda (SE); Nils Finnstedt, Göteborg (SE)

(73) Assignee: SEMCON SWEDEN AB, Göteborg (SE)

( * ) Notice: Subject to any disclaimer, the term of this patent is extended or adjusted under 35 U.S.C. 154(b) by 2 days.

(21) Appl. No.: 15/038,776

(22) PCT Filed: Sep. 24, 2014

(86) PCT No.: PCT/SE2014/051093
§ 371 (c)(1),
(2) Date: May 24, 2016

(87) PCT Pub. No.: WO2015/088417
PCT Pub. Date: Jun. 18, 2015

(65) Prior Publication Data
US 2016/0375863 A1    Dec. 29, 2016

(30) Foreign Application Priority Data

Dec. 13, 2013  (EP) ..................................... 13197161

(51) Int. Cl.
*G06F 17/00* (2006.01)
*B60S 1/08* (2006.01)

(52) U.S. Cl.
CPC ........... *B60S 1/0822* (2013.01); *B60S 1/0862* (2013.01); *B60S 1/0896* (2013.01)

(58) Field of Classification Search
CPC .... B60S 1/0822; B60S 1/0862; B60S 1/0896; B60S 1/482; Y10S 318/02
USPC .................. 701/36, 49; 318/5, 483
See application file for complete search history.

(56) References Cited

U.S. PATENT DOCUMENTS 5,568,026 A * 10/1996 Welch ................... B60S 1/0814
                                            318/41
5,694,011 A * 12/1997 Corey ....................... B60S 1/08
                                            318/280

(Continued)

FOREIGN PATENT DOCUMENTS

DE    29 500 081.3 A1    1/1995
DE       29500081 U1     4/1995

(Continued)

OTHER PUBLICATIONS

Internationa Preliminary Report on Patentability of PCT/SE2014/051093 dated Jun. 14, 2016.

(Continued)

*Primary Examiner* — Gertrude Arthur Jeanglaude
(74) *Attorney, Agent, or Firm* — Moore & Van Allen PLLC; W. Kevin Ransom

(57) ABSTRACT

Water is removed from the windshield of a ground vehicle via a wiper sweeping across the windshield, thus transporting the water thereon to a particular side. At least one remote sensor registers set of parameters in respect of other ground vehicles. A controller unit determines a point in time when a substantial amount of water is expected to hit the windshield of the own vehicle as the result of another vehicle moving proximate thereto and controls the operation of the wiper such that, before said point in time, the wiper is placed at a predetermined position. At said point in time, a stroke of the at least one wiper is initiated from the predetermined position over said surface. In one embodiment, this means moving the at least one wiper in a continuous sweep such that it passes the predetermined position at said point in time.

18 Claims, 4 Drawing Sheets

(56) References Cited

U.S. PATENT DOCUMENTS

| | | | |
|---|---|---|---|
| 6,262,410 B1* | 7/2001 | Stam | B60S 1/0822 |
| | | | 15/DIG. 15 |
| 6,263,537 B1 | 7/2001 | Saito | |
| 6,617,564 B2* | 9/2003 | Ockerse | B60S 1/0818 |
| | | | 250/208.1 |
| 2011/0010045 A1 | 1/2011 | Yopp et al. | |
| 2014/0265980 A1 | 9/2014 | Kracker et al. | |
| 2015/0353024 A1* | 12/2015 | Cooper | B60R 11/04 |
| | | | 348/148 |

FOREIGN PATENT DOCUMENTS

| | | |
|---|---|---|
| DE | 10 2008 049 983 A1 | 4/2010 |
| DE | 102008049983 A1 | 4/2010 |
| DE | 10 2010 032 858 A1 | 7/2010 |
| DE | 102010032858 A1 | 3/2011 |
| EP | 1 674 356 A1 | 6/2006 |
| EP | 1674356 A1 | 6/2006 |
| FR | 2970928 A1 | 3/2010 |
| FR | 2970928 A1 | 8/2012 |
| JP | 1996-0299128 | 5/1998 |
| JP | 2008-0220208 | 3/2010 |

OTHER PUBLICATIONS

Written Opinion of the International Searching Authority for PCT/SE2014/051093 dated Oct. 4, 2015.
International Search Report for PCT/SE2014/051093 dated Oct. 4, 2015.

* cited by examiner

AUTOMATIC REMOVAL OF WATER FROM VEHICLE SURFACES

CROSS-REFERENCE TO RELATED APPLICATIONS

This application is a national stage application (filed under 35 § U.S.C. 371) of PCT/SE2014/051093, filed Sep. 24, 2014 of the same title, which, in turn, claims priority to EP Application No. 13197161.6 filed Dec. 13, 2013 of the same title; the contents of each of which are hereby incorporated by reference.

FIELD OF THE INVENTION

The present invention relates generally to the improvement of the viewing possibilities from ground vehicles travelling during precipitation. More particularly the invention relates to a method, a computer program product and a system for removing water from a surface of a transparent body part of a ground vehicle.

BACKGROUND OF THE INVENTION

Automatic windscreen wipers whose operation is determined by a rain sensor, for example with respect to sweep speed and repetition frequency, have been on the market for some time now. Moreover, various solutions have been presented to further enhance a driver's interface to the wiping function and increase the viewing possibilities in difficult weather conditions.

For example JP 1996-0299128 shows a system for adjusting a wiper stop time depending on the presence or non-presence of a car running ahead or a change in an inter-vehicle distance. Here, the distance between the own car and a car running ahead is measured, and when it is determined that there is a risk of receiving water splash from the car running ahead based on the inter-vehicle distance and the own car's speed, an intermittent stop time for the wiper is reduced. Thus, the wiper's capacity to remove water from the windscreen is increased.

JP 2008-0220208 discloses another solution according to which the wiping operation is controlled based on the presence or absence of a preceding vehicle travelling ahead of an advancing direction of one's own vehicle. Here, a laser, a speed sensor and a navigation system are used together with a raindrop sensor to control the operation of the wiper, such that the operation suits any rain drops and splashes ending up on the windscreen, and at the same time, the wiping operation is stabilized.

Consequently, solutions are known for automatically controlling the windscreen wipers of a car with respect to any splashes and spray from other vehicles travelling in the same direction as the own car. However, there is yet no efficient general control means for handling splashes and spray from other road participants which is independent from the travelling direction of the other vehicles relative to the own vehicle.

SUMMARY OF THE INVENTION

The object of the present invention is therefore to solve the above problem, and thus offer an improved solution for removing water from the outer surface of a transparent body part of a ground vehicle, which transparent body may be represented by windshield/windscreen window, a rear window and/or a side window of the ground vehicle, is arranged to enable optical registration of external objects, and where the water originates from precipitation having splashed up due to the movements of other ground vehicles.

According to one aspect of the invention, the object is achieved by the initially described system, wherein the controller unit is configured to, based on the set of features registered in respect of at least one other vehicle, determine a point in time when a substantial amount of water is expected to hit the surface of the transparent body part. The controller unit is also configured to control the wiper such that, before said point in time, the wiper is placed at a predetermined position on said surface; and at said point in time, a stroke of the at least one wiper is initiated from the predetermined position over said surface. In practice, this preferably means moving the wiper in a continuous sweep such that it passes the predetermined position at said point in time.

This system is advantageous because it maximizes the chances of obtaining a clear view of the environment in which the vehicle travels also when the weather conditions are difficult and when the traffic is heavy.

According to one preferred embodiment of this aspect of the invention, the at least one remote sensor comprises: a radar sensor, a laser sensor, an image sensor and/or a data interface configured to receive information designating a velocity and position of at least one other ground vehicle, which information originates from said at least one other ground vehicle. Thus, the controller unit is provided with an adequate basis for determining the point in time when any substantial amount of water can be expected to hit the surface of the transparent body part.

According to another preferred embodiment of this aspect of the invention, the at least one remote sensor is particularly configured to register the set of features in respect of other vehicles that approach the vehicle in which the system is included, where the other vehicles have a travelling direction which is generally opposite to or generally coincides with the advancing direction of the vehicle in which the system is included. Consequently, the system is well adapted to handle splashes from oncoming vehicles as well as overtaking vehicles and vehicles being overtaken.

The registered set of features for a particular other vehicle preferably includes: at least one parameter expressing a relative speed between the vehicle in which the system is included and the other vehicle, at least one parameter expressing a relative position for the other vehicle and a size measure of the other vehicle. Namely, based thereon, the controller unit may determine the points in time for any splashes on the transparent body part which are caused by other vehicles in the vicinity of the own vehicle.

According to a further preferred embodiment of this aspect of the invention, the controller unit is specifically configured to: receive a velocity signal describing an absolute speed of the vehicle in which the system is included; determine an absolute speed of another vehicle approaching the vehicle in which the system is included based on the velocity signal and the registered set of features for said other vehicle; and control the wiper based on the absolute speed of said other vehicle. Thereby, it is possible to synchronize a repetition frequency of the wiper action with the respective passage of each vehicle in a series of oncoming vehicles.

According to another preferred embodiment of this aspect of the invention, the system includes a rain sensor configured to register water (in any of its states of matter) on said surface of the transparent body part, which water is presumed to originate from precipitation. Moreover, the controller unit is configured to control the operation of the wiper in further response to an output signal from the rain sensor. Preferably, the controller unit is configured to receive first and second output signal values from the rain sensor representing an amount of water on the surface of the transparent body part prior to and after that respectively the wiper passes the rain sensor. The controller unit is further configured determine a difference between the first and second output signal values; and if the difference is less than a threshold value, deactivate the control of the operation of the at least one wiper. Hence, the proposed automatic control of the wiper can be stopped whenever the conditions are such that it is no longer necessary to remove any water from the surface of the transparent body part.

According to another aspect of the invention, the object is achieved by a ground vehicle including the above-proposed system. Such a vehicle is advantageous for the same reasons as the above-proposed system.

According to another aspect of the invention, the object is achieved by the method described initially, wherein a point in time when a substantial amount of water is expected to hit said surface of the transparent body part is determined based on a set of features registered in respect of at least one other vehicle. The wiper is then controlled such that, before said point in time, the wiper is placed at a predetermined position on said surface. At said point in time, a stroke of the wiper is initiated from the predetermined position over said surface. The advantages of this method, as well as the preferred embodiments thereof, are apparent from the discussion above with reference to the proposed system.

Further advantages, beneficial features and applications of the present invention will be apparent from the following description and the dependent claims.

BRIEF DESCRIPTION OF THE DRAWINGS

The invention is now to be explained more closely by means of preferred embodiments, which are disclosed as examples, and with reference to the attached drawings.

DESCRIPTION OF PREFERRED EMBODIMENTS OF THE INVENTION

Figure 1:
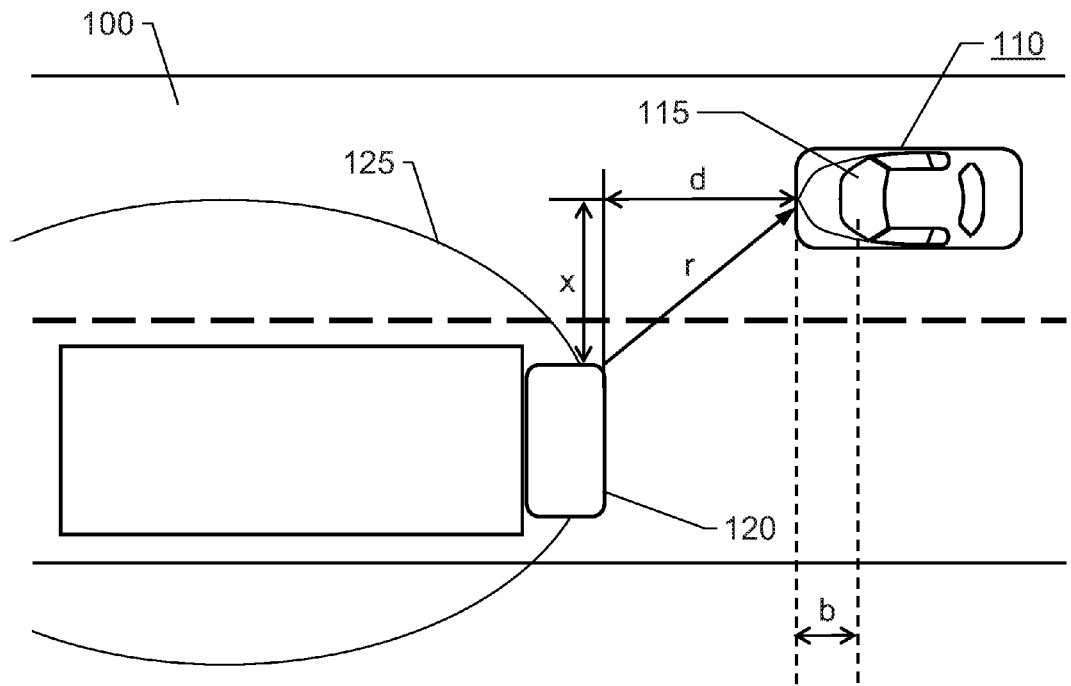
FIG. 1 shows a schematic view from above of a vehicle including the proposed system and another vehicle which causes a spray zone including water in some form.
Figure 2:
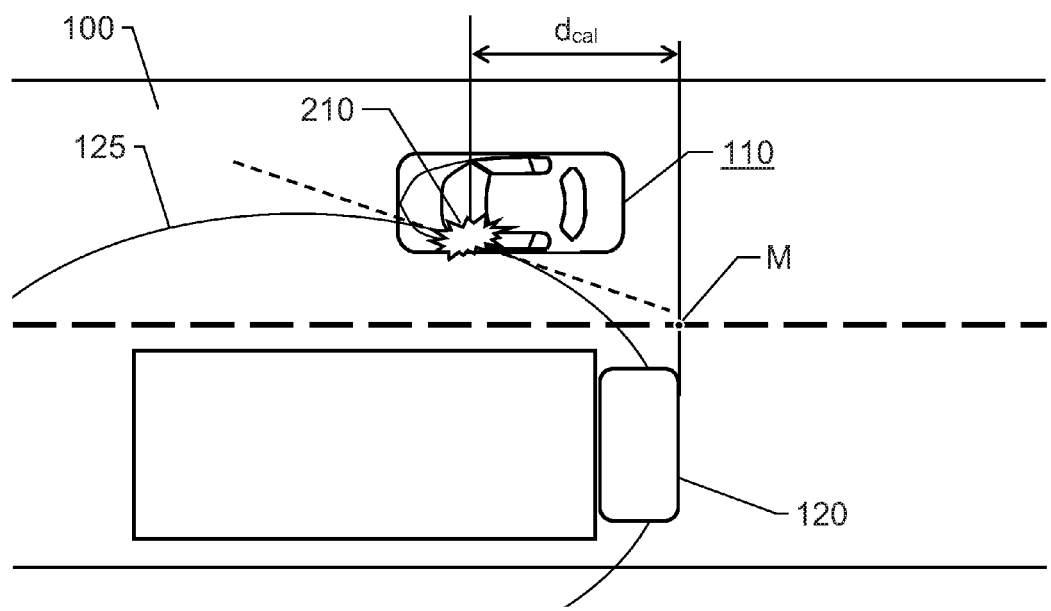
FIG. 2 illustrates a situation when the vehicle including the proposed system reaches the other vehicle's spray zone.
Figure 4:
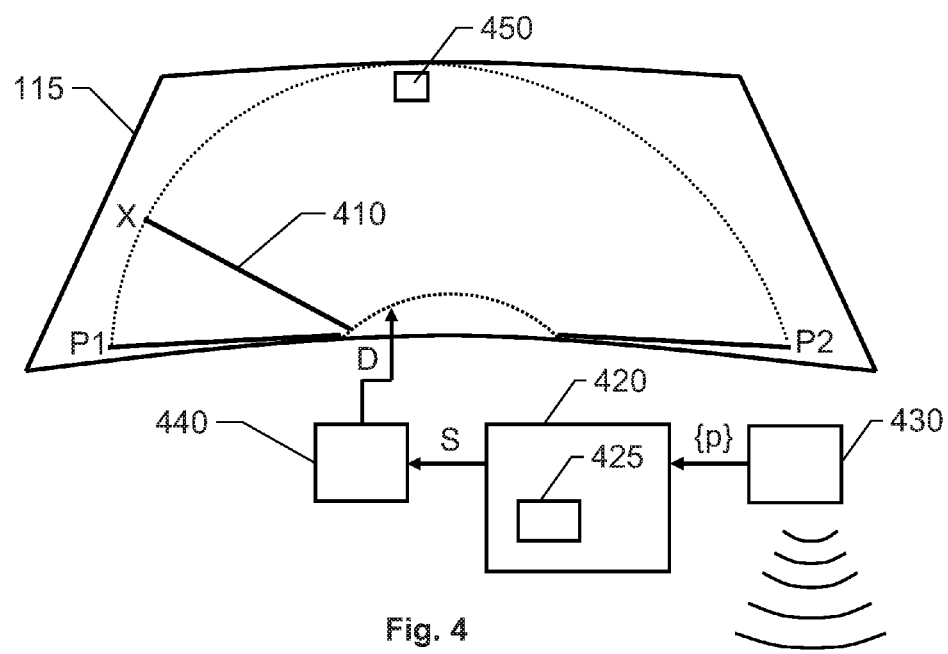
FIG. 4 shows a schematic windshield and a system according to one embodiment of the invention.

FIGS. 1 and 2 show schematic views from above of a vehicle 110 including the proposed system and another vehicle 120, which causes a spray zone 125 including water in any of its states of matter, e.g. in the form of liquid, snow spray and/or slush. FIG. 4 shows an example of a surface of a transparent body part of the vehicle 110 in the form of a schematic windshield 115. I.e. the transparent body part is arranged to enable optical registration of objects outside the vehicle 110 from inside of the same. Typically, of course, the windshield 115 is arranged to provide a driver of the vehicle 110 with a view of the road and the traffic.

As mentioned above, the normal automatic wiping function of a land motor vehicle, such a car, may not be capable of removing the water from the spray zone 125 of the oncoming vehicle 120 that hits the windscreen 115 sufficiently fast. Thus, a substantial amount of water may remain on the windscreen 115 for a relatively long time, say 0,5 to 1,5 seconds, before the scheduled movement of the wipers has cleaned the windscreen 115. Of course, since the driver's view of the road may be fully obscured due to the water on the windscreen 115, such a delay is potentially very dangerous. Most drivers therefore decide to manually active the wiper function prematurely relative to the scheduled movement. This is suboptimal with respect to timing, and per se, causes unnecessary distraction from the driving.

Therefore, according to the invention, the wiper function is made proactive. More precisely, this means that a system is provided, which in addition to at least one wiper 410 includes a controller unit 420 and at least one remote sensor 430. The at least one remote sensor 430, however, is preferably represented by one or more pieces of equipment that are already included in the vehicle 110 for other purposes, e.g. safety related, to register other vehicles.

The at least one wiper 410 is configured to sweep one or more flexible blades across the windscreen 115, thus transporting any water thereon to a particular side of this surface (here the far right side of the windscreen 115). The at least one remote sensor 430 is configured to register sets of features {p} of other ground vehicles 120 approaching the vehicle 110 in which the proposed system is included, i.e. the own vehicle.

Primarily, it is assumed that the other ground vehicle 120 being represented by such a set of features {p} approaches the vehicle 110 in a direction being generally opposite to, or generally coinciding with, an advancing direction of the vehicle 110. Theoretically, however, a vehicle 120 represented by the set of features {p} may travel in any direction relative to the vehicle 110. Nevertheless, the set of features {p} in respect of a given vehicle 120 preferably contains at least one parameter expressing a relative speed between the vehicle 110 and the other vehicle 120, at least one parameter expressing a relative position for the other vehicle 120 and a size measure of the other vehicle 120. Thus, based on the set of features {p} and provided that the road is wet, it is possible to determine a spray zone 125 associated with the other vehicle 120. Hence, it is also possible to estimate a potential splash in connection with approaching this vehicle 120.

To register the sets of features {p}, the at least one remote sensor 430 may include one or more radar sensors, one or more laser sensors and/or one or more image sensors. Moreover, as a complement or an alternative, a data interface may be included, which is configured to receive information designating a velocity and position of at least one other ground vehicle. This information, in turn, is presumed to originate from said at least one other ground vehicle 120. I.e. in this scenario, each vehicle reports information about itself via a particular channel, which then forwards relevant parts thereof to said data interface.

Figure 3:
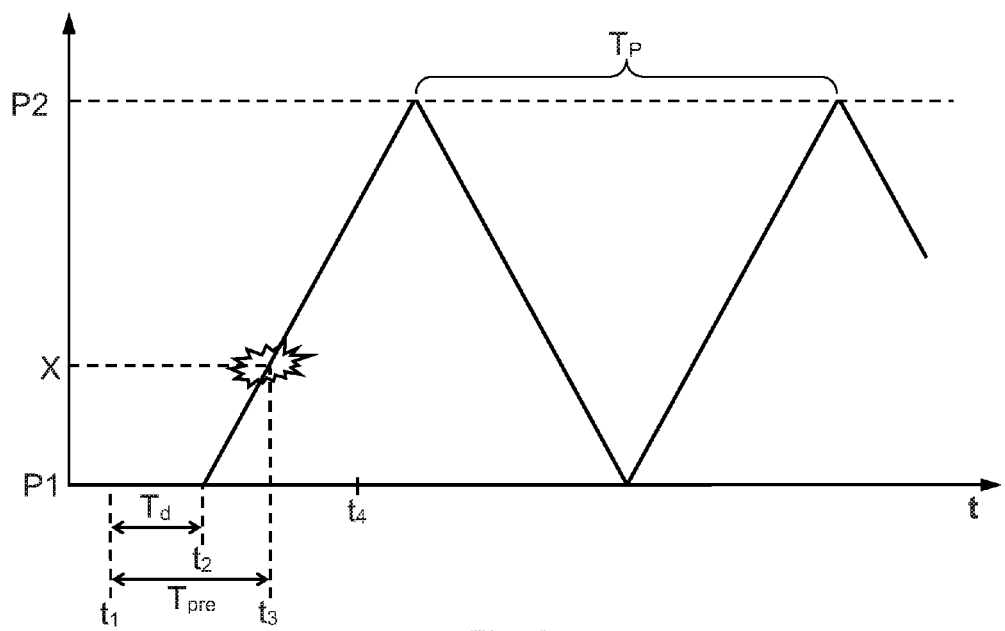
FIG. 3 shows a diagram representing the movement of a wiper as a function of time.

The controller unit 420 is configured to, based on the set of features {p} registered in respect of other vehicles 120 approaching the vehicle 110, determine a point in time when a substantial amount of water 210 is expected to hit said surface of the transparent body part 115. In FIG. 3, this point in time is designated $t_3$. The controller unit 420 is further configured to control the at least one wiper 410 such that, before said point in time $t_3$, the at least one wiper 410 is placed at a predetermined position X from which it is estimated that a substantial amount of said water 210 can be removed with a shortest delay in a single stroke of the at least one wiper 410 over the windscreen 115. For example, the controller unit 420 may produce a control signal S, which is sent to an electric motor and gear unit 440. In response to the control signal S, in turn, the electric motor and gear unit 440 drives the at least one wiper 410 (here symbolized with a signal D), such that the at least one wiper 410 moves from a respective first position P1 (e.g. a rest position) to the predetermined position X. Given that each of the at least one wiper 410 is configured to sweep over a portion of the outer surface of the windscreen 115 from a first end position P1 to a second end position P2, the predetermined position X typically corresponds to ⅕ to ½, and preferably around ⅓, of the total distance between the first and second end positions P1 and P2 respectively. Of course, the predetermined position X may depend on the number of wipers and their respective range of operation on the windscreen 115 in relation to where a driver/camera is expected to have his/her/its center field of view.

In this context, it is worth mentioning that the water 210 hitting the windscreen 115 may come in many different forms, e.g. as liquid, snow spray or slush; and the road wetness can be anything from almost dry to fully flooded. Moreover, the nature of the road surface and the type of tires used on the other vehicles may vary considerably. Nevertheless, these factors have relatively minor influence on when (i.e. the point in time $t_3$) the at least one wiper 410 should be located at the predetermined position X in order to be capable of removing a large amount of water from the windscreen 115 with a shortest delay in a single stroke. Therefore, the proposed solution does not specifically take said factors into consideration.

According to one preferred embodiment of the invention, the controller unit 420 is configured to receive a velocity signal describing an absolute speed of the vehicle 110. Based on the velocity signal and the registered set of features {p} for the other vehicle 120, the controller unit 420 is further configured to determine an absolute speed of the vehicle 120 approaching the vehicle 110. The absolute speed, in turn, forms a basis for the controller unit's 420 control of the at least one wiper 410. Alternatively, a relative velocity between the vehicles 110 and 120 can be determined via a sensor (e.g. of radar or laser type) in the vehicle 110; and then, the measured relative velocity may form a basis for the controller unit's 420 control of the at least one wiper 410.

Preferably, the system also contains a rain sensor 450 configured to register any kind of water (e.g. in liquid form, in the form of snow, slush, frost or hail) on the windscreen 115. The water is presumed to originate from precipitation, and may have reached the windscreen 115 either directly, or indirectly by splashing up from other vehicles. The rain sensor 450 may be located at any position from which it can register relevant windscreen coatings. However, it is preferable if the rain sensor 450 is arranged such that at least one of the at least one wiper sweeps over it when being operated to move from the first end position P1 to the second end position P2.

In any case, the controller unit 420 is preferably configured to control the operation of the at least one wiper 410 in further response to an output signal from the rain sensor 450. This may involve activating the proposed system whenever an output signal from the rain sensor 450 indicates that the amount of water on the windscreen 115 exceeds a threshold level.

Furthermore, in order to determine when it is appropriate to deactivate the proposed system, it is advantageous if the controller unit 420 is configured to operate as follows. At a first point in time, prior to the at least one wiper 410 passing the rain sensor 450, the controller unit 420 receives a first output signal value from the rain sensor 450 representing an amount of water on the windscreen 115. At a second point in time, after that the at least one wiper 410 has passed the rain sensor 450, the controller unit 420 receives a second output signal value from the rain sensor 450 representing an amount of water on the windscreen 115. Then, the controller unit 420 determines a difference between the first and second output signal values. If the difference is less than a threshold value, the controller unit 420 deactivates the proposed control of the operation of the at least one wiper 410. Namely, this is interpreted as a situation where the windscreen 115 is relatively dry, and consequently, the fact that the vehicle 110 entered the (presumed) spray zone 125 of the other vehicle 120 did not result in any substantial amounts of water on the windscreen 115.

Although the above description specifically refers to a windscreen window, according to the invention, the solution may equally well be applied in order to remove water from any other kind of surface of a transparent body part 115 of a ground vehicle, which body part is arranged to enable optical registration (by a human observer and/or automatic image registering means) of objects outside of the vehicle 110. Thus, the transparent body part 115 may for example be represented by a rear window, a side window or the cover of a combined headlight-camera unit.

In FIG. 3 we see a diagram representing the movement of a wiper 410 as a function of time t. The wiper 410 is configured to sweep across a windscreen 115 by moving from the first end position P1 to the second end position P2, back to the first end position P1, and so on. When having returned to the first end position P1, the wiper 410 may either immediately start moving towards the second end position P2 to execute another repetition of the sweep operation, so that a sweep period becomes $T_P$ (as illustrated in FIG. 3); or wait a stop time before starting to move towards the second end position P2 (i.e. if so-called intermittent operation is applied).

In any case, here, we assume that the controller unit 420 has determined that a substantial amount of water is expected to hit the windscreen 115 at a point in time $t_3$ due to a contact with and/or entry into another vehicle's 120 spray zone 125. Therefore, at this point in time $t_3$ the wiper 410 needs to be located at the predetermined position X in order to be able to remove as much as possible of said amount of water in a single stroke of the wiper 410 with a shortest delay. Moving the wiper 410 from the first end position P1 to the predetermined position X takes a certain time. This means that the movement must be initiated at a point in time $t_2$ prior to $t_3$, or earlier. Moreover, since due to various inertia in the components of the wiper 410 as such and in the electric motor and gear unit 440 there is a delay $T_d$ between receiving the control signal S ordering movement of the wiper 410 and the actual start time $t_2$, the control signal S must be received in the electric motor and gear unit 440 on or before a yet earlier point in time $t_1$. Hence, the controller unit 420 shall generate the control signal S a pre interval $T_{pre}$ before the point in time $t_3$ when said substantial amount of water is expected to hit the windscreen 115.

Figure 5:
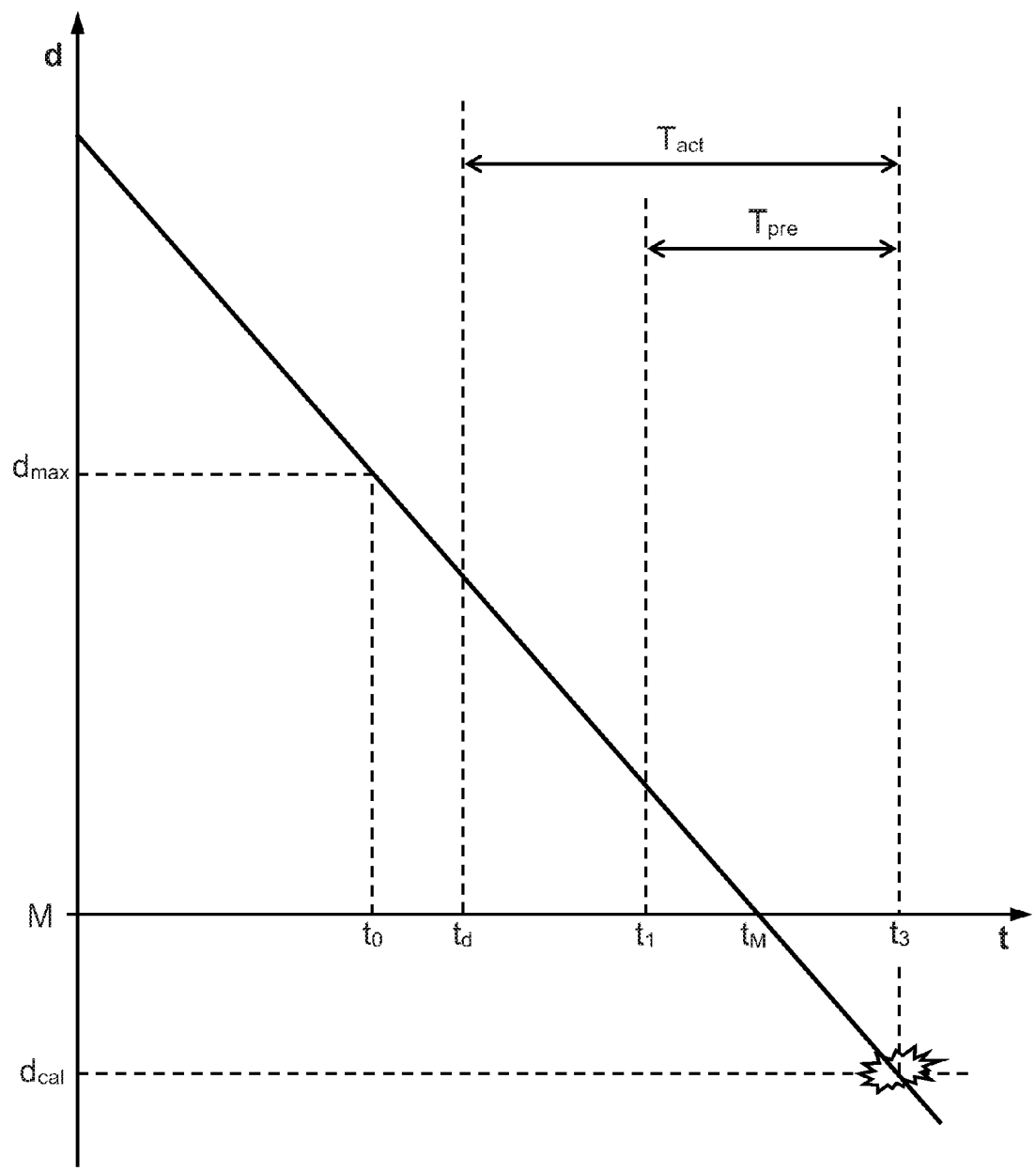
FIG. 5 shows a diagram representing a distance between the vehicle including the proposed system and the other vehicle as a function of time.

FIG. 5 shows a diagram representing a longitudinal distance d between the own vehicle 110 and the other vehicle 120 as a function of time t. Here, we see the point in time $t_3$ when a substantial amount of water is expected to hit the windscreen 115. The diagram further shows a calibration distance $d_{cal}$ representing a negative distance between the vehicles 110 and 120, i.e. after that they have passed one another, corresponding to when said amount of water 210 hits the windscreen 115. We also see a point in time $t_M$ prior to that when the vehicles 110 and 120 meet one another (cf. FIGS. 1 and 2) as well as the yet earlier point in time $t_1$ when the control signal S shall be generated. Moreover, the diagram in FIG. 5 shows a point in time $t_d$ representing when the controller unit 420 determines the point in time $t_3$. The time difference between the point in time $t_d$ and the point in time $t_3$ may thus be referred to as an activation time $T_{act}$. The at least one remote sensor 430 has a maximum range, which can be translated into a maximum operating distance $d_{max}$ for the proposed system. This means that between an initial point in time to and the point in time $t_d$ the controller unit 420 receives a respective set of features {p} for the vehicles 120 in the vicinity of the own vehicle 110 based upon which set of features {p} the controller unit 420 determines the point in time $t_3$.

Returning now to FIG. 1, we will exemplify how the point in time $t_3$ may be determined according to one embodiment of the invention. To this aim, a radial distance r and a lateral distance x between the vehicles 110 and 120 are defined. Here, the lateral and radial distances x and r respectively may either be registered by a respective dedicated sensor (e.g. of radar or laser type) for each measure, or by a common sensor (e.g. of radar or laser type) for both measures. The longitudinal distance d, in turn, is determined as:

$$d=\sqrt{r^2-x^2}.$$

A relative velocity $\dot{d}$ between the vehicles 110 and 120 is calculated as:

$$\dot{d}=\cos(\sin^{-1}(x/r))\cdot\dot{r}$$

Moreover, since, typically, the radar and/or laser sensor used to measure the radial distance r is located in front of the windscreen 115 relative to a travel direction of the vehicle 110 (e.g. integrated into a bumper), a tunable distance b must be compensated for, which tunable distance b represents a measure parallel to the longitudinal distance d between the sensor and the windshield 115. The calibration distance $d_{cal}$ must also be compensated for. The point in time $t_3$ may thus be calculated as:

$$t_3 = \frac{d + b + d_{cal}}{\dot{d}}.$$

Preferably, the controller unit 420 contains, or is in communicative connection with a memory unit 425 storing a computer program product, which contains software for making the controller unit 420 execute the above-described actions when the computer program product is run in the controller unit 420.

Figure 6:
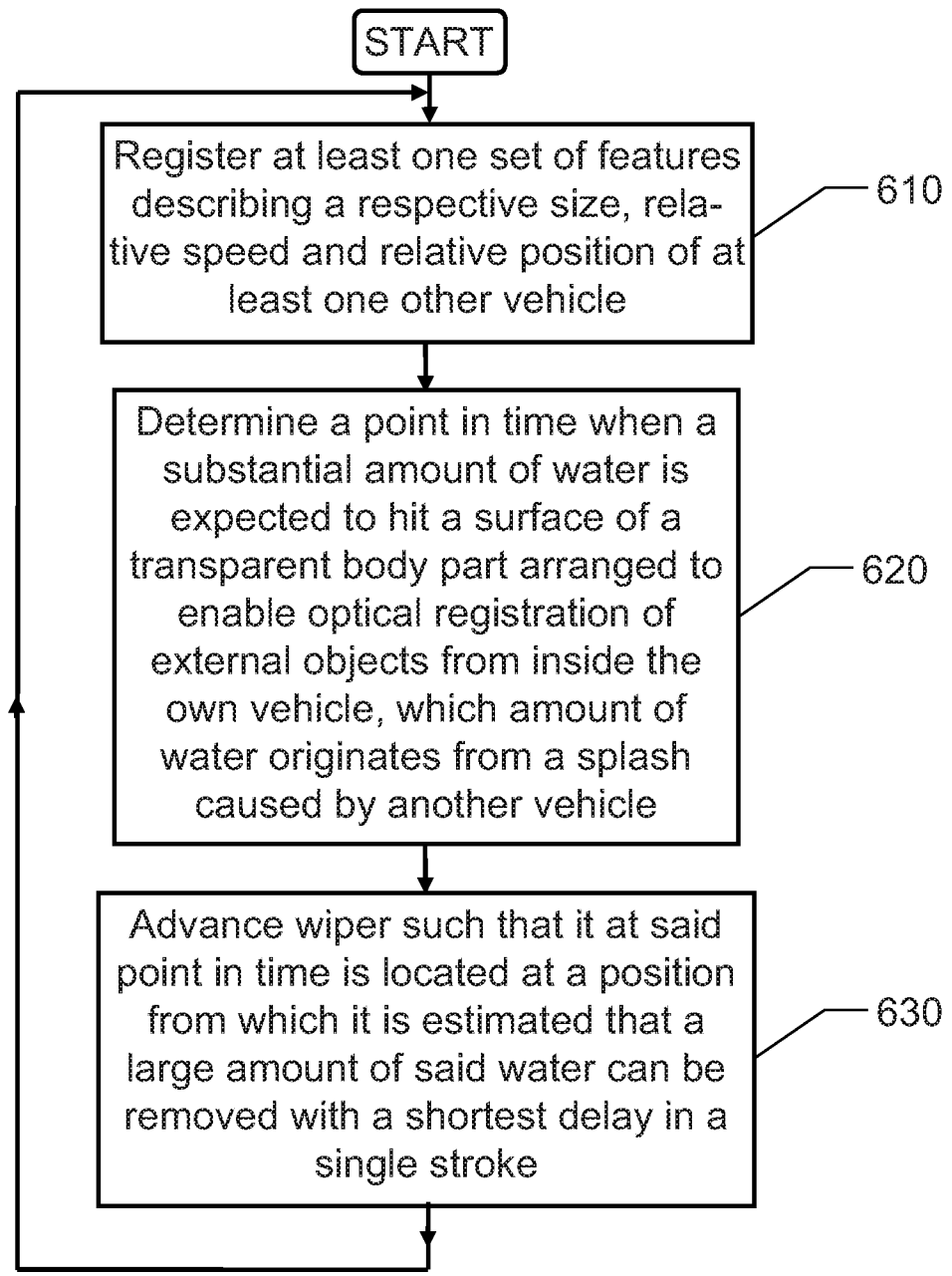
FIG. 6 illustrates, by means of a flow diagram, the general method according to the invention.

In order to sum up, and with reference to the flow diagram in FIG. 6, we will now describe the general method of removing water from a surface of a transparent body part of a ground vehicle according to the invention.

In a first step 610, at least one set of features {p} is registered in respect of at least one other vehicle 120 approaching the own vehicle 110. The features in said set {p} are based on signals registered by at least one remote sensor 430 and describe characteristics of the other vehicle 120, such as its size, relative speed and relative position.

Then, in a step 620, a point in time $t_3$ is determined, which designates when a substantial amount of water 210 is expected to hit a surface of a transparent body part 115 of the own vehicle 110 (e.g. the windscreen), which transparent body part 115 is arranged to enable optical registration of external objects from inside the own vehicle 110. Here, it is assumed that the amount of water 210 originates from a splash that is caused by the other vehicle 120, and the point in time $t_3$ represents the instant when the own vehicle 110 enters a spray zone 125 associated with the other vehicle 120.

Subsequently, in a step 630, at least one wiper 410 is advanced on the transparent body part 115, such that at said point in time $t_3$, the at least one wiper 410 is located at a predetermined position X from which it is estimated that a large amount of said water 210 can be removed with a shortest delay and in a single stroke of the at least one wiper 410 across the surface of the transparent body part 115. This sweeping operation preferably involves completing a full stroke of the at least one wiper 410 from a first end position P1 to a second end position P2. As discussed above, advancing the at least one wiper 410 so that it is located at the predetermined position X at the point in time $t_3$ typically means that a corresponding control signal S is generated at a point in time $t_1$ a pre interval $T_{pre}$ earlier, and that the at least one wiper 410 passes the predetermined position X at the point in time $t_3$ in a continuous sweep across the surface.

After step 630, thereafter the procedure returns to step 610.

All of the process steps, as well as any sub-sequence of steps, described with reference to FIG. 6 above may be controlled by means of a programmed computer apparatus. Moreover, although the embodiments of the invention described above with reference to the drawings comprise a computer apparatus and processes performed in a computer apparatus, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The program may either be a part of an operating system, or be a separate application. The carrier may be any non-transitory entity or device capable of carrying the program. For example, the carrier may comprise a storage medium, such as a Flash memory, a ROM (Read Only Memory), for example a DVD (Digital Video/Versatile Disk), a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

Although the present invention is primarily intended for road vehicles, such as automobiles/cars, trucks and motorcycles, it should be pointed out that the invention is also applicable to any other type of ground vehicles, for instance locomotives and water born vessels. Moreover, it is not necessary that a human observer carries out the optical registration through the transparent body part (e.g. a windscreen window). Instead, according to the invention, a camera (or other image registering means) may equally well effect this optical registration.

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures, but may be varied freely within the scope of the claims.

The below Table 1 summarizes the labels used in the attached drawings.

TABLE 1

| Label | Designation | Label | Designation |
|---|---|---|---|
| 100 | road | D | drive signal |
| 110 | own vehicle | M | meeting point |
| 115 | transparent body part | {p} | set of features |
| 120 | other vehicle | P1 | first end position |
| 125 | spray zone | P2 | second end position |
| 210 | substantial amount of water | S | control signal |
| 410 | wiper | $t_1$ | first point in time |
| 420 | controller unit | $t_2$ | second point in time |
| 425 | memory unit | $t_3$ | third point in time |
| 430 | remote sensor | $t_4$ | fourth point in time |
| 440 | motor and gear unit | $T_d$ | delay |
| 450 | rain sensor | $t_M$ | meeting time |
| d | distance between vehicles | $T_P$ | sweep period |
| $d_{cal}$ | calibration distance | $T_{pre}$ | pre interval |
| $d_{max}$ | maximum operating distance | X | wiper position |

The invention claimed is:

1. A system for removing water from a surface of a transparent body part of a ground vehicle which transparent body part is arranged to enable optical registration of objects outside of the vehicle, the system comprising:
   at least one wiper configured to sweep one or more flexible blades across the surface of the transparent body part, thus transporting any water on said surface to a particular side of this surface;
   a controller unit configured to control the operation of the at least one wiper; and
   at least one remote sensor configured to register sets of features of other ground vehicles,
   wherein the controller unit is configured to:
   determine, based on the set of features registered in respect of at least one other vehicle, a point in time when a substantial amount of water is expected to hit said surface of the transparent body part; and
   control the at least one wiper such that, before said point in time, the at least one wiper is placed at a predetermined position on said surface; and at said point in time initiate a stroke of the at least one wiper from the predetermined position over said surface.

2. The system according to claim 1, wherein the at least one remote sensor comprises at least one of: a radar sensor, a laser sensor, an image sensor and/or a data interface configured to receive information designating a velocity and position of at least one other ground vehicle which information originates from said at least one other ground vehicle.

3. The system according to claim 1, wherein the at least one remote sensor is configured to register the set of features in respect of other vehicles approaching the vehicle in which the system is included:
   in a direction being generally opposite to an advancing direction of the vehicle in which the system is included, and/or
   in a direction generally coinciding with the advancing direction of the vehicle in which the system is included.

4. The system according to claim 1, wherein said registered set of features for a particular other vehicle comprises:
   at least one parameter expressing a relative speed between the vehicle in which the system is included and the other vehicle,
   at least one parameter expressing a relative position for the other vehicle and
   a size measure of the other vehicle.

5. The system according to claim 4, wherein the controller unit is configured to control the at least one wiper based on said registered set of features.

6. The system according to claim 4, wherein the controller unit is configured to:
   receive a velocity signal describing an absolute speed of the vehicle in which the system is included,
   determine an absolute speed of another vehicle approaching the vehicle in which the system is included based on the velocity signal and the registered set of features for said other vehicle, and
   control the at least one wiper based on the absolute speed of said other vehicle.

7. The system according to claim 1, further comprising a rain sensor configured to register water in any of its states of matter on said surface of the transparent body part, which water originates from precipitation; and the controller unit is configured to control the operation of the at least one wiper in further response to an output signal from the rain sensor.

8. The system according to claim 7, wherein the controller unit is configured to:
   receive a first output signal value from the rain sensor representing an amount of water on said surface of the transparent body part at a first point in time prior to the at least one wiper passing the rain sensor;
   receive a second output signal value from the rain sensor representing an amount of water on said surface of the transparent body part at a second point in time after that the at least one wiper has passed the rain sensor;
   determine a difference between the first and second output signal values; and
   if the difference is less than a threshold value, deactivate the control of the operation of the at least one wiper.

9. The system according to claim 1, wherein the transparent body part comprises at least one of a windshield/windscreen window, a rear window and a side window of the ground vehicle.

10. A vehicle, comprising a system for removing water from a surface of a transparent body part of a ground vehicle which transparent body part is arranged to enable optical registration of objects outside of the vehicle, the system comprising:
    at least one wiper configured to sweep one or more flexible blades across the surface of the transparent body part, thus transporting any water on said surface to a particular side of this surface;
    a controller unit configured to control the operation of the at least one wiper; and
    at least one remote sensor configured to register sets of features of other ground vehicles,
    wherein the controller unit is configured to:
    determine, based on the set of features registered in respect of at least one other vehicle, a point in time when a substantial amount of water is expected to hit said surface of the transparent body part; and control the at least one wiper such that, before said point in time, the at least one wiper is placed at a predetermined position on said surface; and at said point in time initiate a stroke of the at least one wiper from the predetermined position over said surface.

11. A computer implemented method for removing water from a surface of a transparent body part of a ground vehicle which transparent body part is arranged to enable optical registration of objects outside of the vehicle, the method comprising:

sweeping at least one wiper having a respective at least one flexible blade across the surface of the transparent body part, thus transporting any water on said surface to a particular side of this surface;

registering, via at least one remote sensor, sets of features of other ground vehicles;

determining, based on the set of features registered in respect of at least one other vehicle, a point in time when a substantial amount of water is expected to hit said surface of the transparent body part;

controlling the at least one wiper such that, before said point in time, the at least one wiper is placed at a predetermined position on said surface; and initiating, at said point in time, a stroke of the at least one wiper from the predetermined position over said surface.

12. The computer implemented method according to claim 11, wherein the set of features represent other vehicles approaching the vehicle in which the method is included, which other vehicles travel:

in a direction being generally opposite to an advancing direction of the vehicle in which the method is included, and/or in a direction generally coinciding with the advancing direction of the vehicle in which the method is included.

13. The computer implemented method according to claim 11, wherein said registered set of features for a particular other vehicle comprises: at least one parameter expressing a relative speed between the vehicle in which the method is included and the other vehicle, at least one parameter expressing a relative position for the other vehicle and a size measure of the other vehicle; and the method further comprises controlling the at least one wiper based on said registered set of features.

14. The computer implemented method according to claim 13, comprising:

receiving a velocity signal describing an absolute speed of the vehicle in which the method is included;

determining an absolute speed of another vehicle approaching the vehicle in which the method is included based on the velocity signal and the registered set of features for said other vehicle; and controlling the at least one wiper based on the absolute speed of said other vehicle.

15. The computer implemented method according to claim 11, further comprising:

registering, via a rain sensor, an output signal representing water in any of its state of matter on said surface of the transparent body part, which water originates from precipitation; and controlling the operation of the at least one wiper in further response to the output signal.

16. The computer implemented method according to claim 15, comprising:

receiving, from the rain sensor, a first output signal value representing an amount of water on said surface of the transparent body part at a first point in time prior to the at least one wiper passing the rain sensor;

receiving, from the rain sensor, a second output signal value representing an amount of water on said surface of the transparent body part at a second point in time after that the at least one wiper has passed the rain sensor;

determining a difference between the first and second output signal values; and if the difference is less than a threshold value deactivating the control of the operation of the at least one wiper.

17. The computer implemented method according to claim 15, comprising:

controlling the at least one wiper in response to the output signal from the rain sensor in such a manner that the at least one wiper is controlled to sweep repeatedly between a first position and a second position on said surface of the transparent body part; and adjusting, within a predefined range, a period time of an operation cycle for said repeated sweeping between the first and second positions to match a set of intervals between the individual vehicles in a series of oncoming vehicles so that, with respect to each vehicle in said series the at least one wiper, before a respective point in time when a substantial amount of water is expected to hit said surface of the transparent body part due a passage of this vehicle, the at least one wiper is placed at the predetermined position.

18. A computer program product stored on a non-transitory computer readable medium comprising software instructions for operation by a computing processor, said instructions comprising:

instructions for sweeping at least one wiper having a respective at least one flexible blade across the surface of the transparent body part, thus transporting any water on said surface to a particular side of this surface;

instructions for registering, via at least one remote sensor, sets of features of other ground vehicles, instructions for determining, based on the set of features registered in respect of at least one other vehicle, a point in time when a substantial amount of water is expected to hit said surface of the transparent body part;

instructions for controlling the at least one wiper such that, before said point in time, the at least one wiper is placed at a predetermined position on said surface; and instructions for initiating, at said point in time, a stroke of the at least one wiper from the predetermined position over said surface.

* * * * *